UNITED STATES PATENT OFFICE.

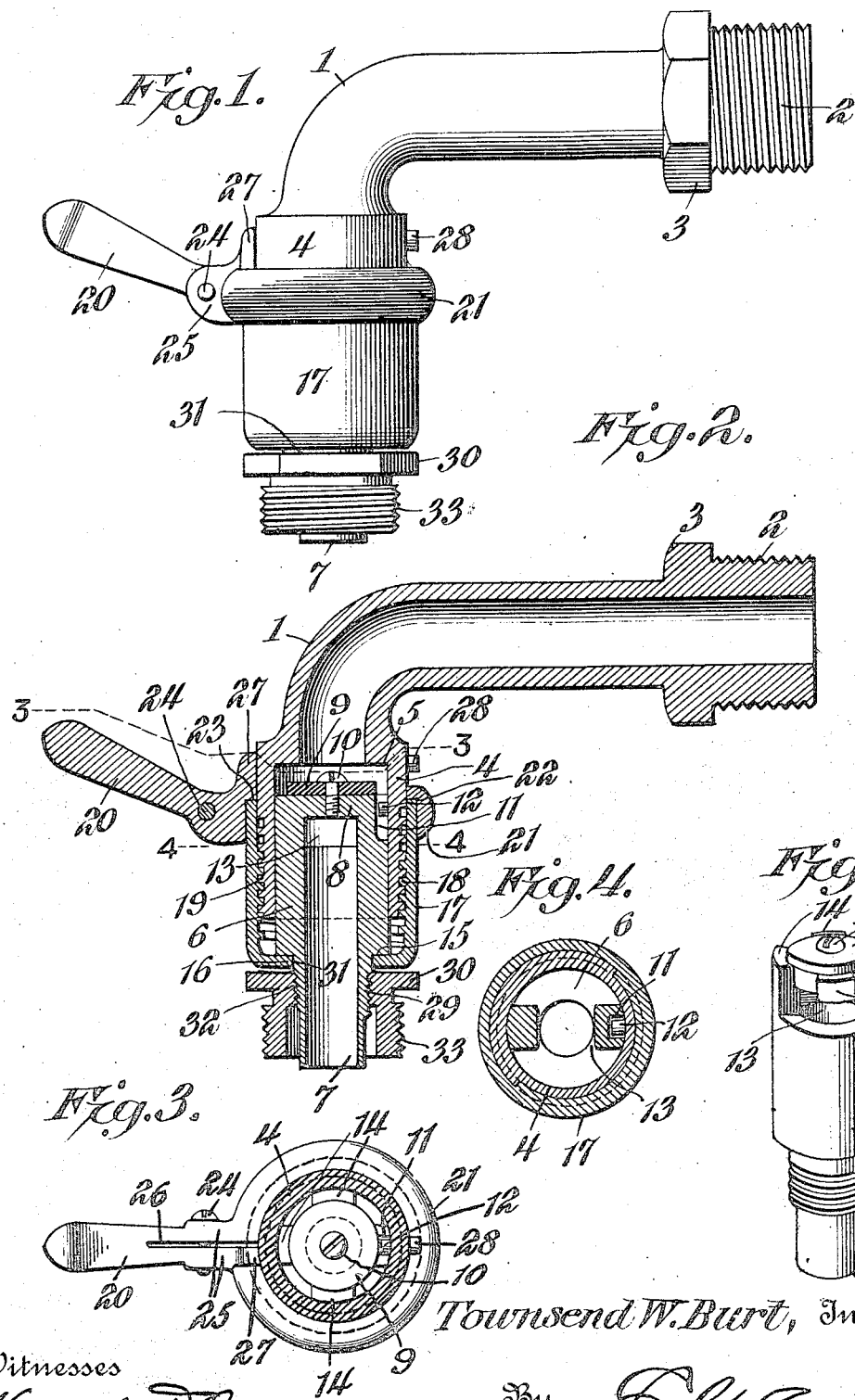

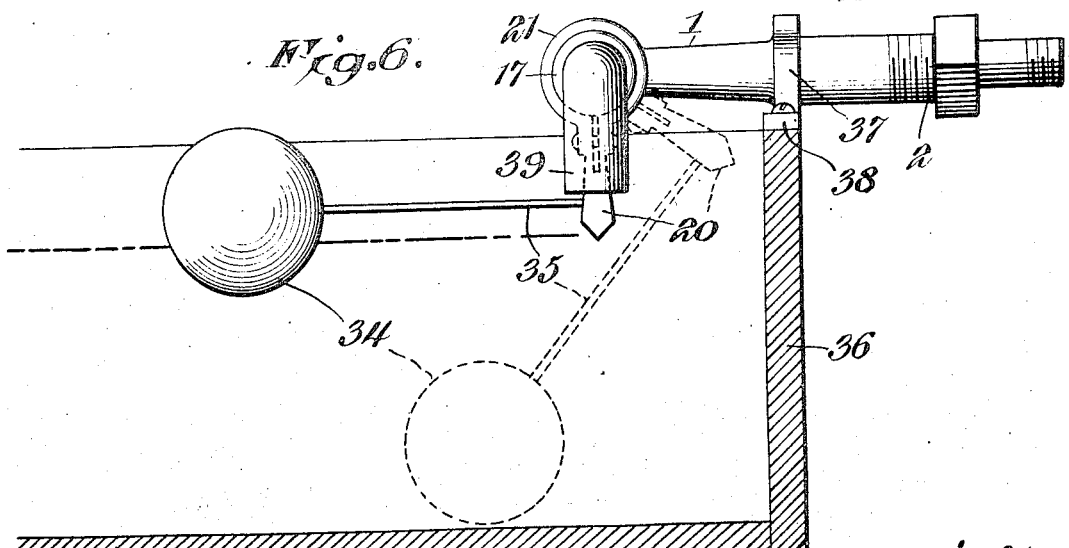
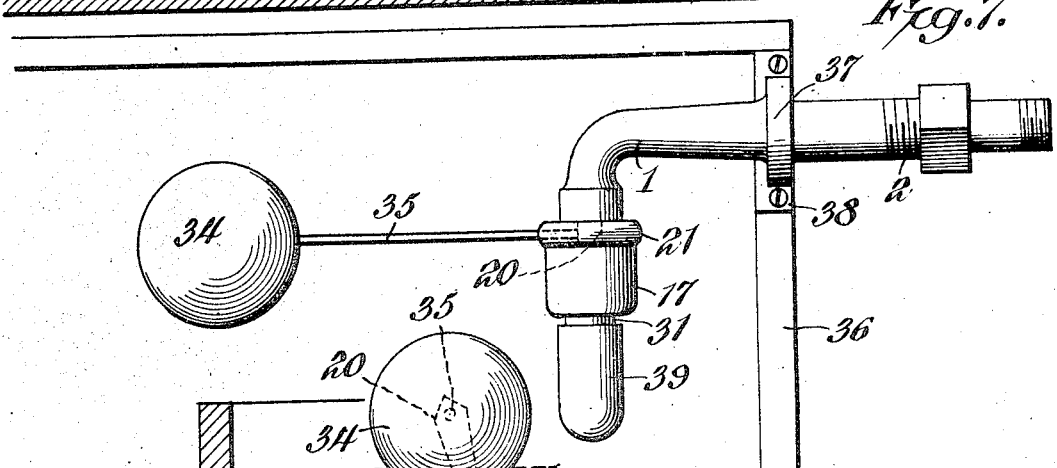
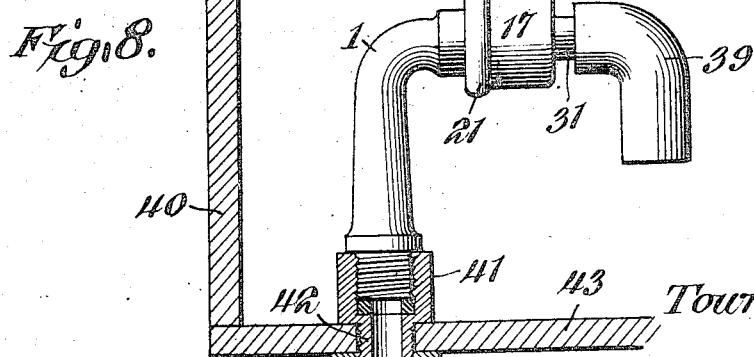

TOWNSEND W. BURT, OF HEMPSTEAD, NEW YORK.

FAUCET.

1,036,446.  Specification of Letters Patent.  Patented Aug. 20, 1912.

Application filed June 13, 1911. Serial No. 632,991.

*To all whom it may concern:*

Be it known that I, TOWNSEND W. BURT, a citizen of the United States, residing at Hempstead, in the county of Nassau and State of New York, have invented a new and useful Faucet, of which the following is a specification.

The invention relates to improvements in faucets.

The object of the present invention is to improve the construction of faucets, and to provide a simple, efficient and comparatively inexpensive faucet, which will not grind the washer against the valve seat, whereby the durability of the washer is materially increased.

A further object of the invention is to provide a faucet, adapted to be readily taken apart to afford access to the valve, and capable of being advantageously employed as a float valve for flush tanks and various purposes.

With these and other objects in view, the invention consists in the construction and novel combination of parts hereinafter, fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a faucet, constructed in accordance with this invention. Fig. 2 is a central longitudinal sectional view of the same. Fig. 3 is a horizontal sectional view on the line 3—3 of Fig. 2. Fig. 4 is a similar view on the line 4—4 of Fig. 2. Fig. 5 is a detail perspective view of the hollow valve plunger. Fig. 6 is a side elevation, the faucet being arranged as a float valve and the tank being in section. Fig. 7 is a plan view of the same. Fig. 8 is a vertical sectional view, the valve being mounted at the bottom of the tank.

Like numerals of reference designate corresponding parts in all the figures of the drawings.

In the accompanying drawings in which is illustrated the preferred embodiment of the invention, the faucet comprises in its construction an approximately L-shaped barrel or body 1, having the terminals 2 of its horizontal branch threaded and provided with a polygonal wrench-receiving portion 3 to enable the faucet to be readily connected with a water pipe or other supply. The vertical arm or branch of the barrel of the faucet is provided with a cylindrical enlargement 4, having a valve seat 5 at its upper end and receiving a hollow slidable valve plunger 6, open at its lower end 7 to form an outlet or nozzle and provided with an upper horizontal end wall 8, which supports a washer 9. The washer 9 co-acts with the valve seat, and it is carried into engagement with the same by the sliding movement of the hollow plunger.

The washer 9 is secured to the upper end of the plunger by a screw 10, or other suitable means, and in order to positively prevent the plunger from rotating in its sliding movement, it is provided in its outer face with a vertical groove 11, extending downwardly from the top of the plunger and receiving a stud or projection 12 of the barrel or body of the faucet. The stud or projection 12, which may consist of a pin, is arranged horizontally and projects from the inner face of the annular enlargement 4, which forms a valve chamber. Any other suitable means may be employed for positively holding the plunger against rotary movement, but such means may be omitted, as the plunger actuating mechanism hereinafter described, rotates around the plunger and imparts only an inward or vertical sliding movement to the same in order to press the washer tightly against the valve seat without grinding or breaking the washer. The plunger is provided at opposite sides of its top portion with openings 13, forming lateral outlets for the water, or other liquid and permitting the same to flow through the top portion of the plunger into the interior of the latter when the valve is open. The plunger is also provided at the top with laterally extending horizontally disposed lugs or portions 14, having rounded outer faces and adapted to bear against the interior of the cylindrical portion 4 of the barrel or body.

The lower reduced portion or end 7 of the plunger forms an annular shoulder 15, which is engaged by an inwardly extending annular flange 16 of a nut 17, having interior screw threads 18, which engage corresponding exterior screw threads 19 of the cylindrical portion of the barrel or body, The nut is adapted to rotate on the cylindrical portion 4, and is caused to move upwardly and downwardly when rotated, and it thereby actuates the hollow plunger to close the valve and releases the hollow plunger to permit the same to open by gravity, when the parts are arranged in a vertical position, or by water pressure when the plunger is arranged in a horizontal position. The nut is equipped with an operating handle 20, formed integral with a collar or ring 21, which is provided with an interior recess 22 to receive the upper portion of the nut. The recess 22 forms an upper interior wall or shoulder 23, which fits against the upper edge of the nut, and the collar or ring is clamped on the nut by means of a screw 24, which connects opposite resilient portions 25 of the handle 20. The inner portion of the handle 20 is provided with a longitudinal slot or kerf 26, and the portions 25 at opposite sides thereof have sufficient resiliency to enable the ring to be securely clamped on the nut by the screw 24, which engages a threaded opening in one of the portions 25 of the handle. The handle is also provided with an upwardly extending lug 27, adapted to engage with a stop 28, consisting of a lug or projection at the upper end of the cylindrical portion 4, as clearly shown in Figs. 1 and 2 of the drawings. The handle is adjustable on the nut by means of the collar and the screw, and it is adapted to be arranged, so that the rotary movement permitted by the lug 27 and the projection 28 will properly open and seat the valve. The stop limits the movement of the handle to prevent the nut from being unscrewed so far that it would come apart. The lower reduced portion of the plunger is provided with exterior screw threads 29 to enable a coupling 30 to be mounted on the plunger for connecting a hose with the same when desired. The threads 29 terminate short of the shoulder 15, and the plunger is provided above the threads adjacent to the shoulder with a smooth portion 31, adapted to permit free rotary movement of the nut on the plunger, and the coupling 30 is spaced from the nut so as not to interfere with the free rotary movement of the said nut on the plunger. The coupling 30 consists of a tubular member or sleeve provided with interior threads 32 to engage the threads 29 of the plunger and having exterior threads 33 to receive a hose (not shown).

The upper end of the coupling sleeve 30 is spaced from the shoulder 15 of the plunger, and the inwardly extending flange 16 of the nut operates between the shoulder 15 and the coupling sleeve and engages the same to positively move the plunger upwardly and downwardly.

The faucet may be employed for various purposes, and it can be advantageously used as a float valve for a flush tank by simply connecting a float 34 with the arm 20 by means of a rod 35, as illustrated in Figs. 6 and 7 of the drawings. As shown in Figs. 6 and 7 of the drawings, the faucet may be arranged in a horizontal position at the upper edge of a flush tank 36, and it is preferably provided with an annular enlargement 37, having an attaching flange or portion 38 at the bottom. The attaching flange or portion 38 is provided with perforations for the reception of screws, or other suitable fastening devices for securing the faucet to the upper edge of the flush tank 36. When the faucet is arranged in this position, the plunger is designed to be equipped with a tubular member in the form of an elbow 39, having a downwardly extending arm or branch for directing the water into the flush tank. The faucet may also be mounted in an upright position at the bottom of a flush tank 40, and its threaded end is screwed into an upper enlarged portion 41 of a vertical tubular member 42, extending through the bottom 43 of the tank and secured to the same by a nut 44, the bottom of the tank being clamped between the nut and the shoulder formed by the enlarged portion 41. The lower portion of the tubular member is threaded to receive the nut 44 and also to receive a union 45 for connecting a water pipe 46 with the tubular member.

When the faucet is arranged, as shown in Fig. 8, the elbow 39 is arranged to direct the water downward into the tank, and the float is connected in the manner before described with the handle of the nut. The raising and lowering of the float through the action of the water rotates the nut and operates the plunger.

No claim is made in the present application to the float actuated means for operating the plunger.

Having thus fully described my invention, what I claim as new and desire to secure by Letters Patent, is:—

1. A faucet of the class described including a body having an interior valve seat and provided with an exteriorly threaded portion, a plunger slidable within the body and having a reduced outer portion forming a shoulder and having exterior screw threads, a nut arranged on the threaded portion of the body and provided with an inwardly extending flange, and a coupling sleeve arranged on the reduced threaded portion of the plunger and spaced from the said shoulder, the inwardly extending flange of the nut operating between the shoulder of the plunger and the coupling sleeve and arranged to engage the same to positively move the plunger upwardly or downwardly.

2. A faucet of the class described including a body having an interior valve seat and provided with an exteriorly threaded portion, said body being also provided with an exterior stop, a plunger slidable in the body, a nut arranged on the threaded portion of the body and engaging and actuating the plunger, and a handle having a collar adjustably mounted on the nut and provided with a projection arranged to engage with the stop for limiting the rotation of the nut.

3. A faucet of the class described including a body having an interior valve seat and provided with an exteriorly threaded portion, said body being also provided with an exterior stop, a plunger slidable in the body, a nut arranged on the threaded portion of the body and engaging and actuating the plunger, a handle split longitudinally at its inner end to provide resilient portions, a collar formed integral with the handle and arranged on the nut and provided with means for engaging the stop, and a screw connecting the resilient portions of the handle for causing the collar to adjustably clamp the nut.

4. A faucet of the class described including a body having an interior valve seat and provided with an exteriorly threaded portion, a plunger slidable within the body and having means for holding a washer in position to co-act with the valve seat and provided with a reduced outer portion forming a shoulder and having exterior screw threads, a nut arranged on the threaded portion of the body and provided with an inwardly extending flange, an operating arm connected with the nut, and an interiorly threaded member arranged on the reduced threaded portion of the plunger and spaced from the said shoulder, the inwardly extending flange of the nut operating between the shoulder of the plunger and the said interiorly threaded member and arranged to engage the same to positively move the plunger inwardly or outwardly.

In testimony that I claim the foregoing as my own, I have hereto affixed my signature in the presence of two witnesses.

TOWNSEND W. BURT.

Witnesses:
SILAS A. WILLIAMS,
AUBREY SOPER.